(12) United States Patent
Vasilik

(10) Patent No.: US 11,048,521 B2
(45) Date of Patent: Jun. 29, 2021

(54) RESILIENT UPGRADABLE BOOT LOADER WITH POWER RESET

(71) Applicant: ADVA Optical Networking SE, Meiningen-Dreißigacker (DE)

(72) Inventor: Kevin J. Vasilik, Cary, NC (US)

(73) Assignee: ADVA Optical Networking SE, Meiningen-Dreißigacker (DE)

( * ) Notice: Subject to any disclaimer, the term of this patent is extended or adjusted under 35 U.S.C. 154(b) by 48 days.

(21) Appl. No.: 16/583,215

(22) Filed: Sep. 25, 2019

(65) Prior Publication Data

US 2021/0089327 A1 Mar. 25, 2021

(51) Int. Cl.
*G06F 9/4401* (2018.01)
*G06F 1/3206* (2019.01)
*G06F 8/61* (2018.01)
*G06F 8/65* (2018.01)

(52) U.S. Cl.
CPC .......... *G06F 9/4408* (2013.01); *G06F 1/3206* (2013.01); *G06F 8/63* (2013.01); *G06F 8/65* (2013.01); *G06F 9/4411* (2013.01)

(58) Field of Classification Search
CPC .................................................... G06F 9/4411
USPC ............................................................. 713/2
See application file for complete search history.

(56) References Cited

U.S. PATENT DOCUMENTS

| 5,568,641 | A | 10/1996 | Nelson | |
| 6,275,931 | B1 | 8/2001 | Narayanaswamy | |
| 7,313,682 | B2 | 12/2007 | Kanapathipillai | |
| 9,411,688 | B1 * | 8/2016 | Poolla | H03K 19/17764 |
| 10,191,811 | B2 * | 1/2019 | Hsu | G06F 9/4401 |
| 2006/0143432 | A1 | 6/2006 | Rothman | |
| 2014/0281466 | A1 * | 9/2014 | Samuel | G06F 9/4408 713/2 |
| 2018/0088963 | A1 | 3/2018 | Arora | |
| 2019/0087578 | A1 * | 3/2019 | Govindarajan | G06F 21/602 |

OTHER PUBLICATIONS

Skomorowski, Markus, Extended European Search Report for Application No. 20197611.5-1224 (which is related to the present application), dated Feb. 22, 2021, 9 Pages, European Patent Office, Munich Germany.

* cited by examiner

*Primary Examiner* — Suresh Suryawanshi

(74) *Attorney, Agent, or Firm* — Kevin E Flynn; Flynn IP Law

(57) ABSTRACT

A process for using a boot loader to load a set of boot commands to a device such as an embedded system before loading a system application. The process may use a combination of a read-only boot source and a pair of upgradable boot sources. Process also includes a power cycle to put system into a known state.

An alternative process may simply use a pair of upgradable boot sources. The processes are resilient to failed updates of an upgradable boot source. After a successful update of an upgradable boot source, a request for a power cycle causes the device to immediately enter a known state and use the updated upgradable boot source.

9 Claims, 6 Drawing Sheets

200

1000

2000

RESILIENT UPGRADABLE BOOT LOADER WITH POWER RESET

BACKGROUND

Field of the Disclosure

This disclosure relates generally to boot loaders for embedded systems.

Related Art

A resilient and upgradable boot loader is an essential component of any embedded system including embedded systems with a level of reliability that it is referred to as a carrier grade embedded system. (see content on Internet at //en.wikipedia.org/wiki/Carrier_grade). The main function of a boot loader is to initialize and set system hardware to a proper and known state before running higher level software. In order to enable new system features and functionality, the boot loader must be also be upgradable. In a carrier-grade system, this upgrade process must be resilient and be able to recover from a corrupted boot loader caused by an event such as power loss during the update. Since the embedded system may be located remotely, it is important that the embedded system perform this update without the need for any other physical interaction. Different methods have been used in the prior art to provide a resilient and upgradable boot loader.

Failsafe Method.

FIG. 1 shows a prior art approach that involves using three boot loader images within the system: a failsafe image 104, a primary image 108, and a secondary image 112. These images are often stored apart from the memory 240 that contains the operating system files. The failsafe image 104 is non-upgradable (read-only) and thus cannot be corrupted. The failsafe image 104 always runs first at power-up and checks the integrity of the upgradable primary image 108. If the primary image 108 is deemed to be good, then the failsafe image 104 executes the primary image 108. Otherwise, the failsafe image 104 will attempt to verify and boot the secondary image 112.

In order to limit the risk of impact to the bootup images, the process to upgrade the primary image 108 does not occur during the upgrade of the secondary image 112. Thus, a power interruption during upgrade of the bootup images would only corrupt one of the two upgradable images (108 or 112). Since a power loss event can only corrupt either the primary image 108 or the secondary image 112 but not both, there will always be at least one good image to boot. After booting with the non-corrupted primary image 108 or secondary image 112, higher level application software will update or fix the corrupt boot loader image.

The problem with the failsafe method is that the state of the system hardware will be a combination of configurations made by the read-only failsafe image 104 and one of the upgradable images, 108 or 112. This is the result of the failsafe image 104 always running at power-up and then executing either the primary image 108 or the secondary image 112.¶

The failsafe image 104 may contain unwanted or unknown system configurations (i.e. bugs 106) that can cause problems as the system continues to boot and operate. These unwanted configurations are not limited to the CPU (or SoC—System on a Chip) 260 but also include interactions with system peripherals 280. Since the failsafe image 104 is not upgradable, these bugs 106 cannot be removed.

Alternatively, a failsafe image 104 that was error-free when placed into service may become problematic as the system including system peripherals evolve over time.

Here is an example of a system peripheral that may remain in a bad state without the use of a system power cycle: I2C (or SMBus) I/O expanders are popular embedded devices used to add additional GPIO resources to a system. The PCA9554 is an example of such a device.

Note that the PCA9554 device has no reset method other than removing power. A non-upgradable failsafe image 104 may incorrectly configure the PCA9554 device to hold another system peripheral in reset or incorrectly set a system status LED. Without a power cycle before booting the upgradable boot loader, the system may stay in this improper state. Thus a power cycle may be needed to clear improper states from some devices.

Swapping Active and Inactive Images.

FIG. 2 shows another prior art upgrade method that has two stored boot loader images. For purposes of illustration, assume there are a first image in memory area 154 and a second image in memory area 158. The system sets an active image 168 which is currently the second image in memory area 158. There is also an inactive image 164 which is currently the first image in memory area 154. The mapping of active image and inactive image to the first image in memory area 154 and the second image in memory area 158 is selectable using a nonvolatile hardware setting. When a new boot loader image update is required, the new image is loaded into the memory area containing the inactive image 164. After loading the new image to become the updated inactive image 164, the inactive image 164 is verified with a checksum.

Once the new boot loader image loaded into the inactive image 164 has been verified, a nonvolatile hardware setting (i.e. reset vector table or boot bus address space) is made to swap the new inactive image 164 to become the new active image 168. The system will then reset itself and boot the new active image 168.¶

Without the ability to power cycle itself after updating one image and making that updated image the active image 168, the system will suffer a similar problem described with the failsafe boot loader. In this case, the system state will be a combination of configurations made by the newly active and newly inactive images. Only a power cycle reset after updating the boot loader can put the system back to a truly known state.

¶Vocabulary.

Unless explicit to the contrary, the word "or" should be interpreted as an inclusive or rather than an exclusive or. Thus, the default meaning of or should be the same as the more awkward and/or.¶

Unless explicit to the contrary, the word "set" should be interpreted as a group of one or more items.

SUMMARY OF THE DISCLOSURE

Aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

Other systems, methods, features and advantages of the disclosed teachings will be immediately apparent or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
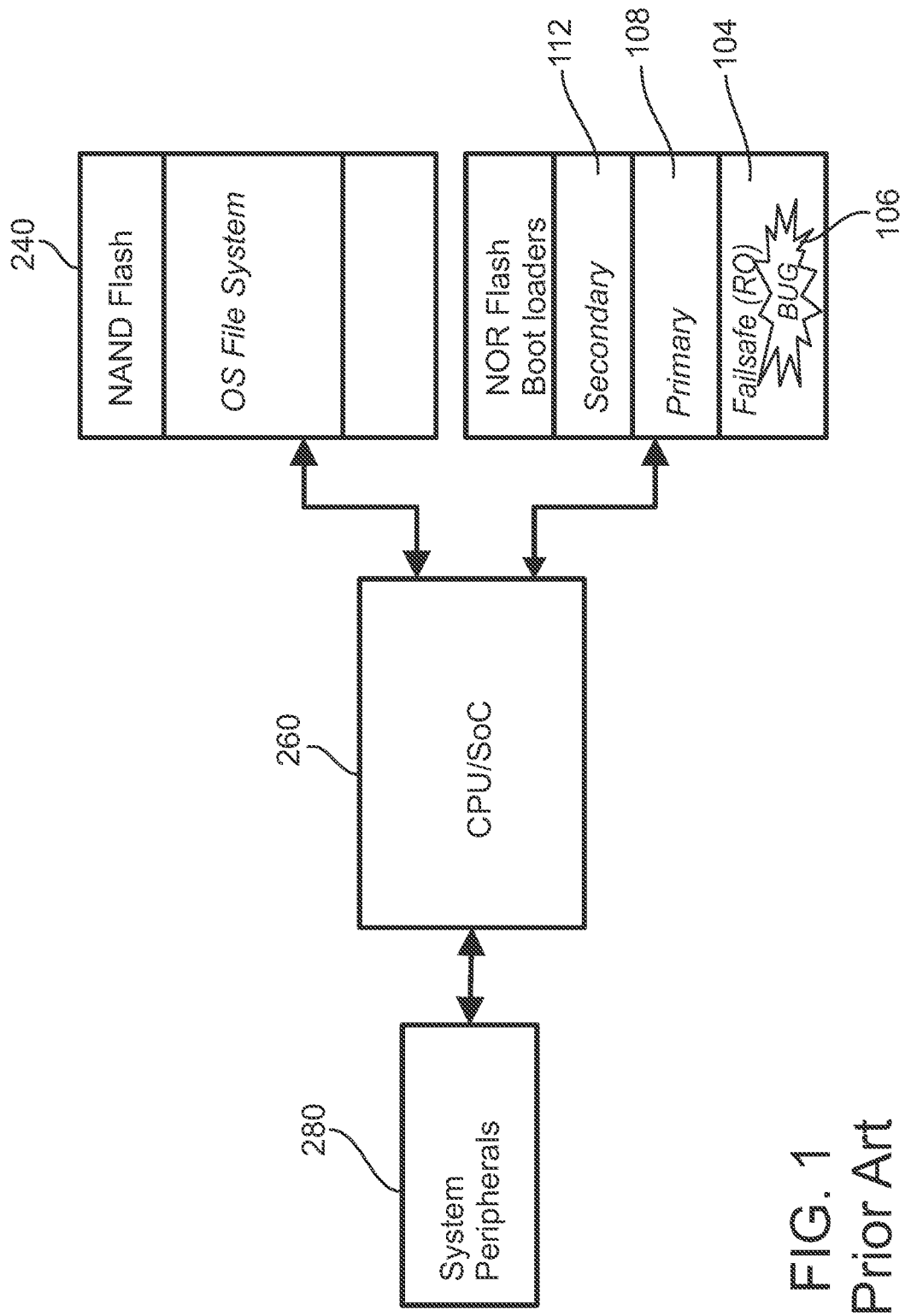
FIG. 1 shows a typical failsafe boot loader.
Figure 2:
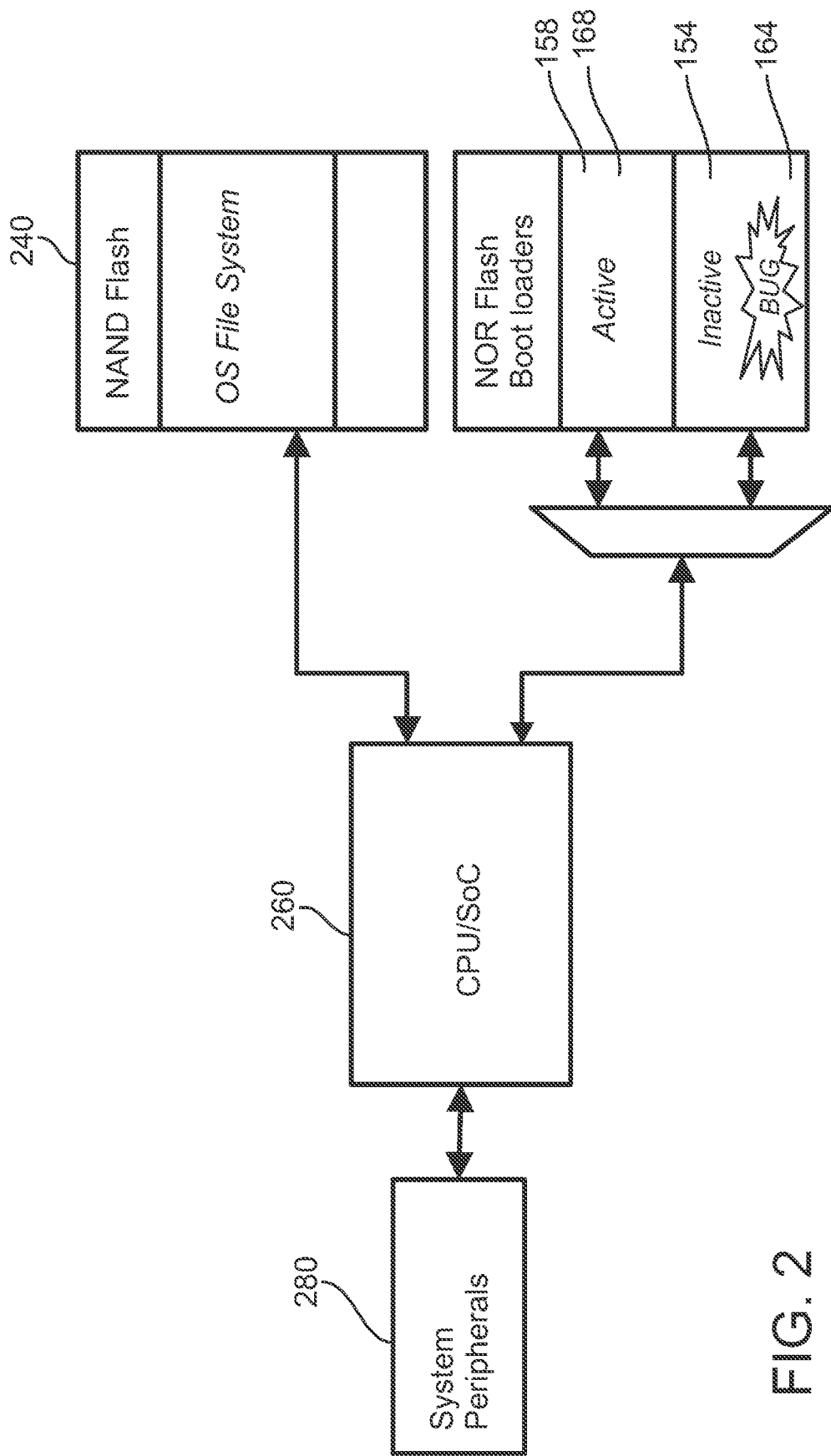
FIG. 2 shows an active/inactive boot loader.
Figure 3:
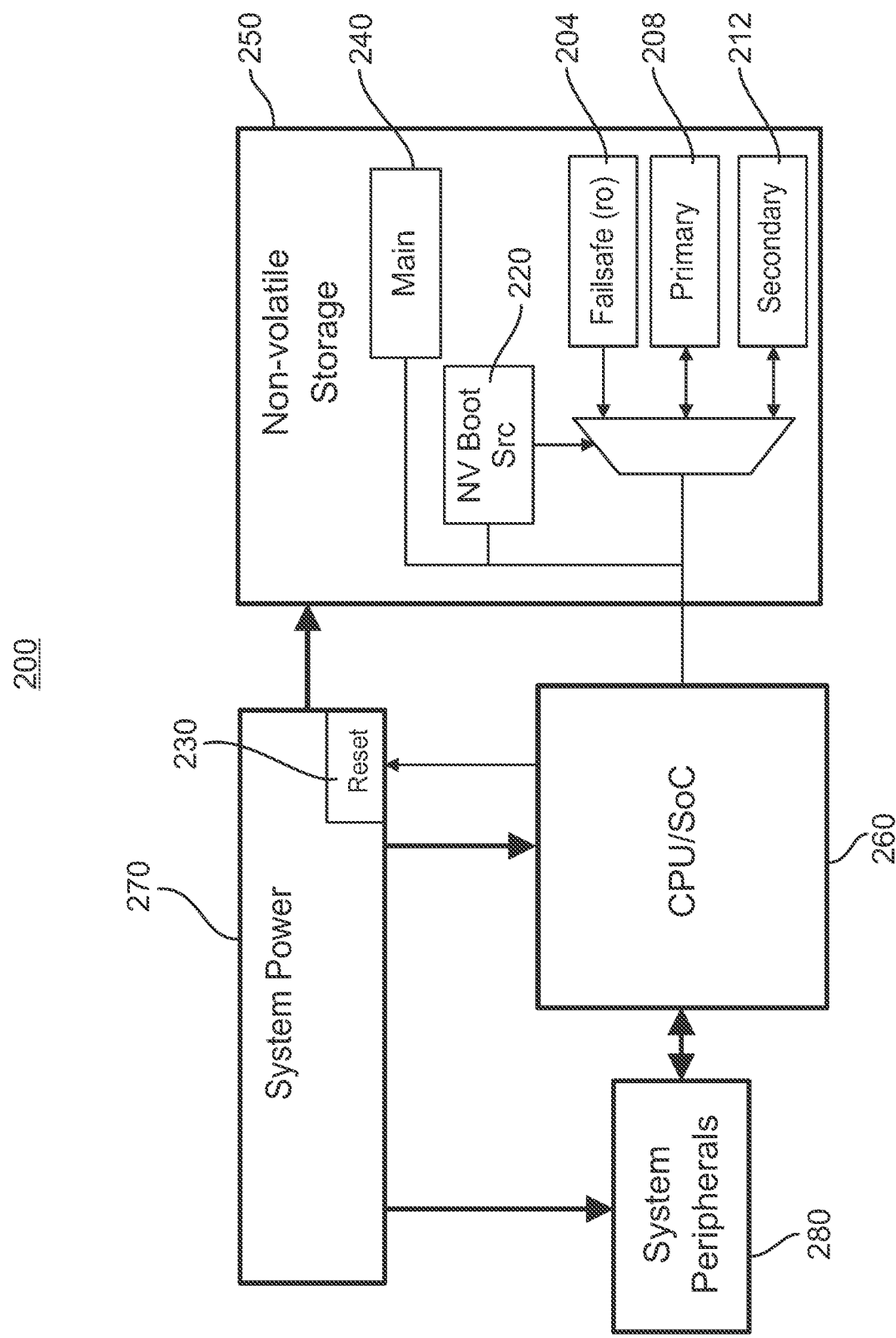
FIG. 3 is a simplified block diagram resilient failsafe boot loader with power reset system.

FIG. 3 illustrates a simplified view of an embedded system 200 with a failsafe boot loader. The embedded system 200 includes a nonvolatile boot source setting 220 and a power supply reset 230.

The boot source setting 220 within the nonvolatile storage device 250 controls which boot source image the nonvolatile storage device 250 provides to the CPU/SoC 260 when requested at power-up. The boot source setting 220 is controllable by the CPU/SoC 260 and is persistent through power cycles. The boot source setting 220 may be set to one of three different images: failsafe image 204, primary image 208, or secondary image 212.

The system power reset 230 allows the CPU/SoC 260 to momentary toggle power provided by the system power unit 270 to the entire system 200, including at least some and ideally all system peripherals 280.

Figure 4:
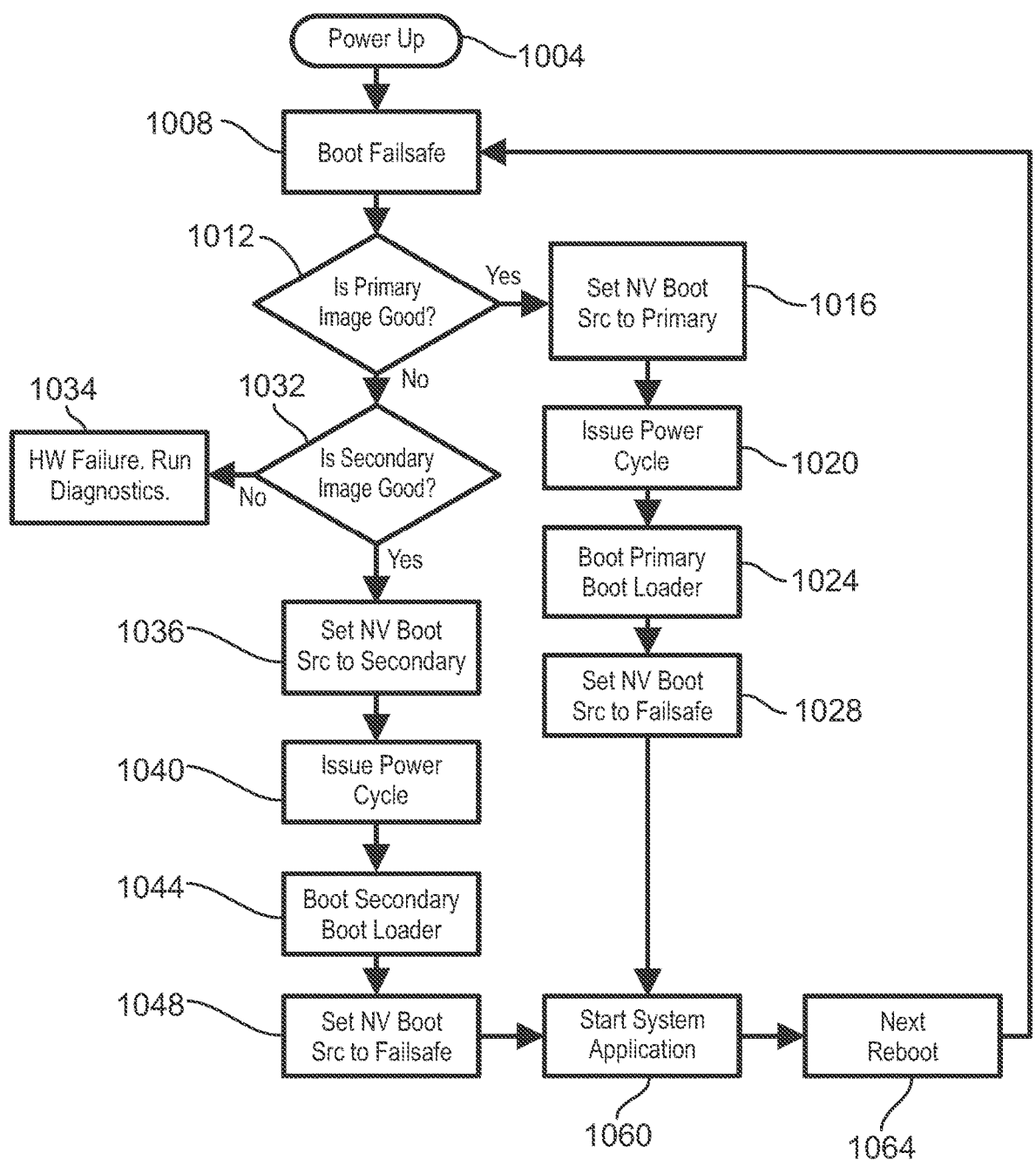
FIG. 4 shows a flow chart for a resilient failsafe boot loader.

FIG. 4 shows a process 1000 for the failsafe boot flow.

Step 1004 Power Up.

Step 1008 After initial power-up, the non-upgradable failsafe image 204 is run.

Branch 1012. The failsafe image 204 checks to ensure that primary image 208 is good (not corrupted). If primary image 208 is good then proceed to Step 1016, else proceed to branch 1032 discussed below.

If Primary Image is Good.

Step 1016. Set boot source setting 220 within the non-volatile storage device 250 to be the primary image 208.

Step 1020 Power cycle the system 200 by having the CPU/SoC 260 activate the system power reset 230 to momentary toggle power provided by the system power unit 270 to the entire system 200, including system peripherals 280. Note as some devices require a power interruption of more than an instant in order to cycle, the power cycle duration may be set to be of sufficient duration to effectively power cycle all components on the system. Note that this step is completed automatically, that is without requiring a human to act to turn off the power to create a power cycle event.

Step 1024 After the power cycle, boot the primary image 208 as the boot source setting 220 points to the primary image 208.

Step 1028 Then set the boot source setting 220 to point to the failsafe image 204 for use after the next power-up 1004.

Step 1060 Start System Application.

After the boot loader has completed its validation process and executed required system initialization and configuration, it will transfer execution to an operating system or other runtime load that executes the system application. Those of skill in the art will recognize that the system application may exist as processes running within an operating system (OS) that is separate from the boot loader image. In this case, the bootloader will first start the OS by loading a kernel image from a non-volatile file system into system RAM. The boot loader will then execute the OS kernel in RAM which will in turn start the system application. Thus, the upgradable boot loader transfers execution to an operating system or other runtime load.

The system application may also exist as addition functionality within the boot loader image itself. In this case, the application is started by simply continuing execution within the boot loader image. Thus, the upgradable boot loader is itself a complete runtime.

Step 1064 Upon next reboot, return to step 1008 and boot failsafe image 204 as the boot source setting 220 within the nonvolatile storage device 250 was set to point to the failsafe image 204. Those of skill in the art will recognize that a system reboot may be triggered by software and that is the path of 1064 to 1008. A reboot after an interval without power would reenter the process 1004 as described above.

Those of skill in the art know that it is common for an embedded system to employ a "watchdog" to detect and recover from malfunctions. A watchdog operates by resetting the system if its timer is not cleared within a defined amount of time. Typically, a watchdog will initiate a processor reset in an attempt to recover a system. However, simply issuing a processor reset may not clear the root cause of why the watchdog triggered. With the addition of a power cycle in the boot process, the system has a better chance of recovering from the reason why the watchdog triggered.

If Primary Image is not Good.

Branch 1032. The failsafe image 204 checks to ensure that secondary image 212 is good (not corrupted). If secondary image 212 is good, then proceed to Step 1036, else proceed to step 1034, declare hardware failure and initiate diagnostics under control of the failsafe image 204. The diagnostics may start automatically or be available as an option to a technician but the diagnostic routines would be within the failsafe image 204. Alternatively, the failsafe image 204 may be used manually boot operating system for use in further diagnostics.

If Secondary Image Is Good.

Step 1036. Set boot source setting 220 within the non-volatile storage device 250 to be the secondary image 212.

Step 1040 Power cycle the system 200 by having the CPU/SoC 260 activate the system power reset 230 to momentary toggle power provided by the system power unit 270 to the entire system 200, including system peripherals 280.

Step 1044 After the power cycle, boot the secondary image 212 as the boot source setting 220 points to the secondary image 212.

Step 1048 Then set the boot source setting 220 to point to the failsafe image 204 for use after the next power-up 1004.

Step 1060 Start System Application. As noted above, after the boot loader has completed its validation process and executed required system initialization and configuration, it will transfer execution to an operating system or other runtime load that executes the system application. The system application may exist as processes running within an operating system (OS) that is separate from the boot loader image. The system application may also exist as addition functionality within the boot loader image itself.

Step 1064 Upon next reboot, return to step 1008 and boot failsafe image 204 as the boot source setting 220 within the nonvolatile storage device 250 was set to point to the failsafe image 204. Those of skill in the art will recognize that a system reboot may be triggered by software and that is the path of 1064 to 1008. A reboot after an interval without power would reenter the process 1004 as described above.

Advantages.

Any system configurations made by the failsafe image 204 are undone by the power cycle 1020 or 1040 and the system 200 is booted from a non-corrupt boot source image (either primary image 208 or secondary image 212). Before the step 1060 of starting the system application, the boot loader using either the primary image 208 or the secondary image 212 will set the boot source setting 200 to point to the failsafe image 204 so that the failsafe 204 is booted should there be a reboot or power-up.

This makes the embedded system 200 have a reliable starting boot source image as the failsafe image 204. The failsafe image 204 although limited in functionality is read-only and not subject to corruption. Corruption of the primary image 208 or the secondary image 212 which might come if a power interruption occurred during an update of primary image 208 or the secondary image 212 will not be a problem as a power interruption will only corrupt one of the two images and will trigger a reboot and the failsafe image 204 will discern which of the two images 208 or 212 to use for a full reboot.

Figure 5:
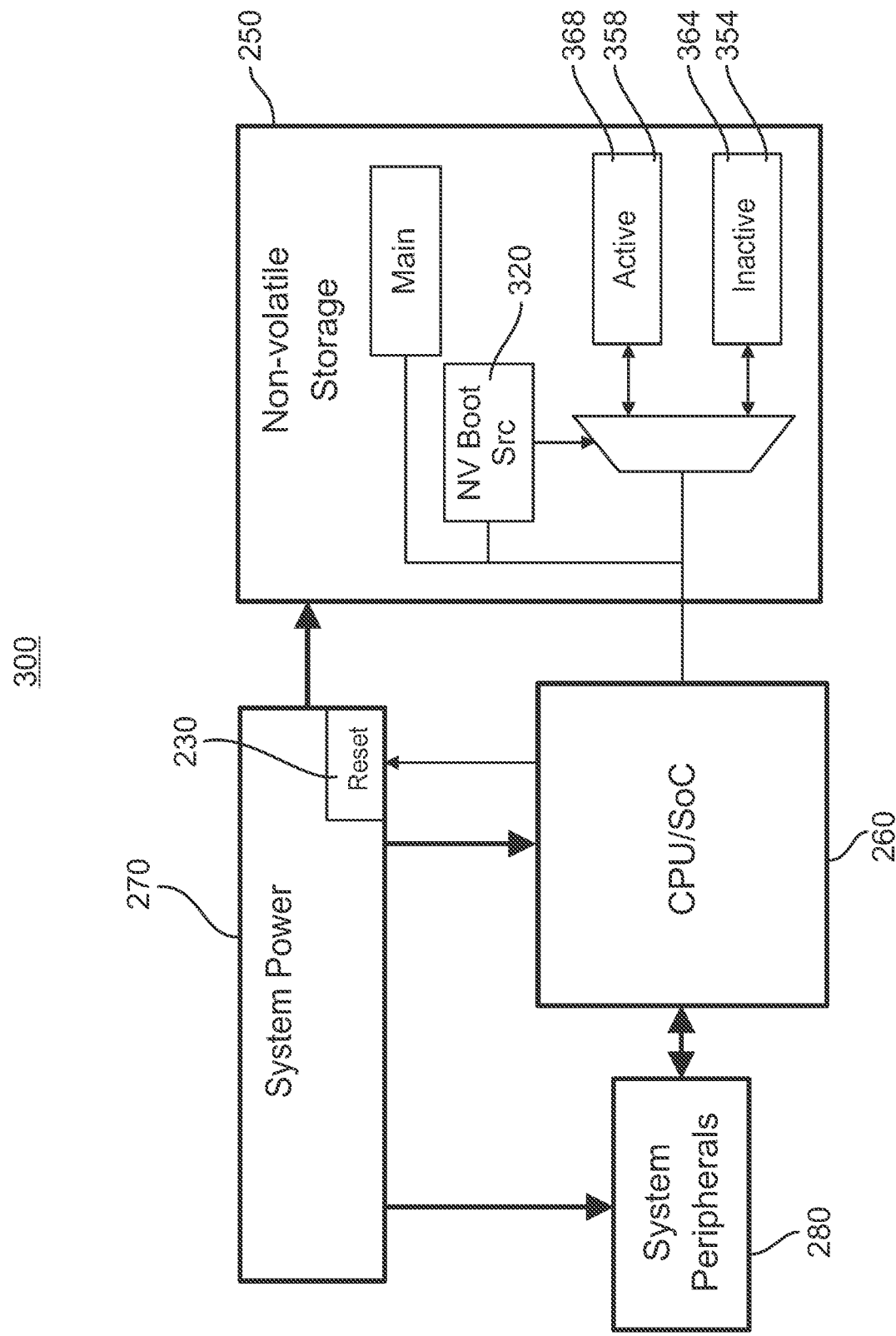
FIG. 5 is a simplified block diagram resilient active/inactive boot loader with power reset system.

FIG. 5 illustrates a simplified view of an embedded system 300 with an active/inactive boot loader.

The active/inactive boot loader includes the system power reset 230 and a non-volatile boot source setting 320 analogous to the boot source setting 220 in embedded system 200. A difference between embedded system 300 and embedded system 200 is that embedded system 300 has just two boot loader images rather than three. There is a first image 354 and a second image 358. One of the two images (354, 358) is deemed to be the active image 368 and one is deemed to be the inactive image 364. The mapping of the active image 368 and inactive image 364 to the first image 354 and the second image 358 is stored in the boot source setting 320.

Figure 6:
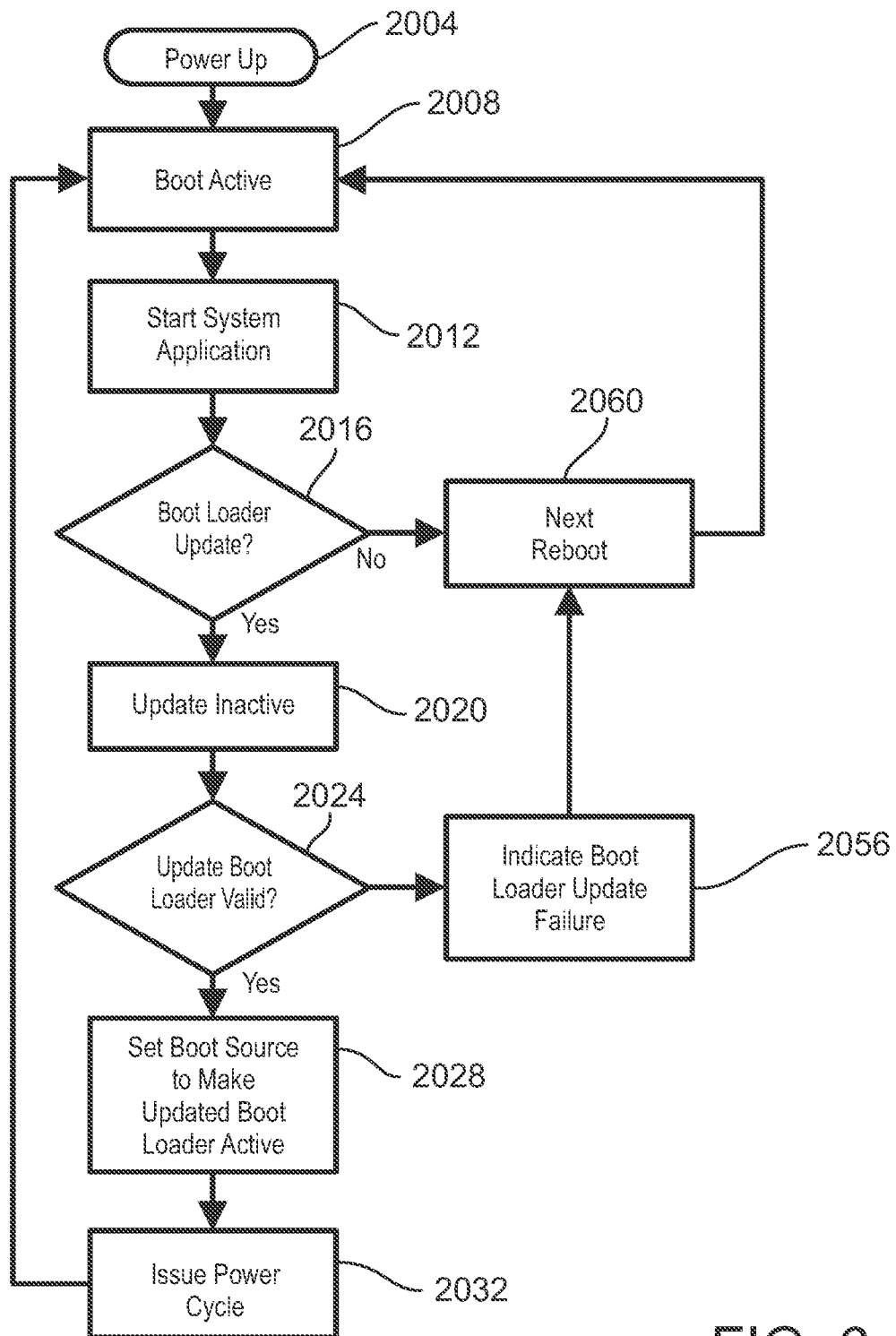
FIG. 6 shows a flow chart for a resilient active/inactive boot loader.

FIG. 6 shows process 2000 for booting embedded system 300.

Step 2004. Power Up.

Step 2008 Look to the boot source setting 320 to know which of the two images (first image 354 and second image 358) is the current active image 368. Assume that is initially second image 358. Boot the active image 368 found at second image 358.

Step 2012 After the active image 368 is booted, start system application. After the boot loader has completed its validation process and executed required system initialization and configuration, it will transfer execution to a runtime load that provides the system application. Those of skill in the art will recognize that the application may exist as processes running within an operating system (OS) that is separate from the boot loader image. In this case, the bootloader will first start the OS by loading a kernel image from a non-volatile file system into system RAM. The boot loader will then execute the OS kernel in RAM which will in turn start the system application. Thus, the upgradable boot loader transfers execution to a runtime load.

The application may also exist as addition functionality within the boot loader image itself. In this case, the application is started by simply continuing execution within the boot loader image. Thus, the upgradable boot loader is itself a complete runtime.

Branch 2016. Check if there is a new boot loader. If yes, then go to step 2020. If no, go to step 2060.

If No Boot Loader Update.

Step 2060 No changes made to the mapping of active image 368 to first image 354 and second image 358. The next reboot will use the same active image 368 as last used.

If there is a Boot Loader Update.

Step 2020. Copy the new boot loader image into the inactive image 364. In this example that was initially first image 354.

Branch 2024. Check that new boot loader image loaded into the inactive image 364 is good (not corrupted). This may be done through checksum or other methods known to those of skill in the art. If good, then proceed to step 2024. Else proceed to step 2056 and assert a boot loader update failure alarm and/or system error log. At the next reboot, the process will be unchanged and the same active image 368 will be used and there will be another attempt to update the inactive image 364.

New Boot Loader Image is Good.

Step 2028. Now that a new boot loader image has been stored and verified, swap the boot source setting 320 for the active image 368 to the location with the new boot loader image. In this example, the boot source setting 320 initially mapped the active image 368 to the second image 258. Now the boot source setting 320 will be set to map the active image 368 to the first image 354.

Step 2032. Power cycle the system 300 by having the CPU/SoC 260 activate the system power reset 230 to momentary toggle power provided by the system power unit 270 to the entire system 300, including system peripherals 280.

Step 2008. The power cycle causes the process 2000 to restart but this time the active image 368 will be mapped to the first image 354 containing the newly downloaded boot loader image.

The process set forth above can be summarized as follows. On initial power-up, the selected active boot loader is run and boots the operation system. The boot loader is updated by writing the new boot loader image to the inactive image location and verified using a checksum and/or version and/or date. If validated, the boot selector is set to make the newly updated boot image active and the system is power cycled. If validation fails, a failure indication is set and the boot loader selection remains with the current boot image.

ALTERNATIVES AND VARIATIONS

Nonvolatile Boot Source Control.

Several different methods can be used to implement the nonvolatile boot source setting (220 or 320). eMMC flash devices provide distinct hardware partitions and a register to control which partition is used to offer the boot image when requested by the connected CPU. Systems using discrete flash devices on a parallel bus can use external nonvolatile logic to manipulate address lines to select different regions of flash memory. Some processor architectures use a programmable reset vector table that can be used to select different regions of nonvolatile memory. Those of skill in the art can substitute other non-volatile memory options to store the nonvolatile boot source setting while staying within the spirit of the teachings of the present disclosure.

System Power Reset Methods.

Resetting power to a system can be implemented various different ways. Power supplies often provide a control input to enable/disable power output. For example, DC-DC converter modules from Vicor provide a "Primary Control" pin that can be used to momentarily disable power output. The method used to fully power cycle the system is not limited to an onboard power subsystem; a full system power cycle can also be initiated by sending a message to an external networked power controller device.

Boot Image Validation.

A common method used to verify that a boot loader image is not corrupt and is safe to boot is to provide a small block of data at the beginning of the image. This block of "header" data can provide information such as image size, version, release date, and a checksum or CRC. Using this information, an image can be verified by comparing the calculated checksum/CRC of the image (excluding the header) to the value provided in the header. Those of skill in the art will appreciate that many other ways are known to check the completeness and lack of corruption in a download (such as CRC32, MD5, and other methods) and one of skill in the art can substitute one of these tests for a checksum or analogous test.

Boot Image Selection Priority.

In the failsafe boot method previously described, the primary and secondary boot loader images are the same. By default, the primary image has the higher selection priority and the secondary is booted only if the primary image is corrupt. An alternative to this is to provide a nonvolatile setting to specify which upgradable image has the higher boot selection priority. In this case, the primary and secondary images may not be the same; one may be the latest version and the other may be the previous version. During the boot loader update process, only one image is updated and is set as the higher priority image.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

Where methods and/or events described above indicate certain events and/or procedures occurring in a certain order, the ordering of certain events and/or procedures may be modified. Additionally, certain events and/or procedures may be performed concurrently in a parallel process when possible, as well as performed sequentially as described above.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A process for using a boot loader to load a set of boot commands to a device before loading a system application; the process comprising:

providing power to a first device with the boot loader and to at least one peripheral device in communication with the first device;

running a read-only boot image; and checking to ensure a first upgradable boot image is not corrupted;

if the check of the first upgradable boot image indicates that the first upgradable boot image is not corrupted, then set a boot source setting within a non-volatile memory to point to the first upgradable boot image; then automatically activating a system power reset for both the first device and the at least one peripheral device; then starting to boot the device using the first upgradable boot image in accordance with the boot source setting to load a set of boot commands; then setting the boot source setting to point to the read-only boot image; and starting a system application for the first device;

if the check of the first upgradable boot image indicates that the first upgradable boot image is corrupted, then check to ensure a second upgradable boot image is not corrupted;

if the check of the second upgradable boot image indicates that the second upgradable boot image is not corrupted, then set the boot source setting within the non-volatile memory to point to the second upgradable boot image; then automatically activating the system power reset for both the first device and the at least one peripheral device; then starting to boot the device using the second upgradable boot image in accordance with the boot source setting to load the set of boot commands; then setting the boot source setting to point to the read-only boot image; and starting a system application for the first device;

if the check of the first upgradable boot image indicates that the first upgradable boot image is corrupted; and the check of the second upgradable boot image indicates that the second upgradable boot image is corrupted then stop to allow a set of diagnostics to be performed.

2. The process of claim 1 wherein the set of diagnostics are initiated automatically within the read-only boot image.

3. The process of claim 1 wherein checking to ensure that the first upgradable boot image is not corrupted uses a checksum.

4. The process of claim 1 wherein an upgradable boot image selected from the group consisting of the first upgradable boot image and the second upgradable boot image transfers execution to an operating system that executes the system application.

5. The process of claim 1 wherein an upgradable boot image selected from the group consisting of the first upgradable boot image and the second upgradable boot image is a complete runtime itself and executes the system application.

6. A process for using a boot loader to load a set of boot commands to a device before loading a system application the process comprising:

assigning one memory location selected from a first memory location and a second memory location to become a current active memory location in accordance with a boot source setting value; and assigning another memory location selected from the first memory location and the second memory location but not the one memory location as a current inactive memory location;

wherein the first memory location, the second memory location, and the boot source setting value are all in non-volatile memory accessible by the boot loader;

providing power to a device with the boot loader and providing power to at least one peripheral device in communication with the device;

booting the device with an upgradable boot image found in the current active memory location as indicated in the boot source setting value, before loading a system application for the device;

if a new upgradable boot image exists, then load the new upgradable boot image to the current inactive memory location;

if a check of the new upgradable boot image in the current inactive memory location indicates a failure to load properly, then a next reboot of the device will continue to use the current active memory location; and if a check of the new upgradable boot image in the current inactive memory location indicates a valid boot image was loaded into the current inactive memory location, then 1) change the boot source setting value to make the current inactive memory location into a new active memory location and make the current active memory location into a new inactive memory location, before 2) applying a power cycle to the device and the at least one peripheral device in communication with the device so that successful loading of the new upgradable boot image causes booting of the device with the new upgradable boot image found in the new active memory location.

7. The process of claim 6 wherein if the check of the new upgradable boot image in the current inactive memory location indicates failure to load properly, then note failure to an alarm log.

8. The process of claim 6 wherein the upgradable boot image transfers execution to an operating system that executes the system application.

9. The process of claim 6 wherein the upgradable boot image is a complete runtime itself and executes the system application.

* * * * *

UNITED STATES PATENT AND TRADEMARK OFFICE
CERTIFICATE OF CORRECTION

PATENT NO. : 11,048,521 B2
APPLICATION NO. : 16/583215
DATED : June 29, 2021
INVENTOR(S) : Kevin J. Vasilik Page 1 of 1

It is certified that error appears in the above-identified patent and that said Letters Patent is hereby corrected as shown below:

In the Claims

Column 9, Line 21, Claim 6, "application" should read --application,--.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*